(12) United States Patent
Savitzky et al.

(10) Patent No.: US 8,072,284 B2
(45) Date of Patent: Dec. 6, 2011

(54) SPLIT DELAY-LINE OSCILLATOR FOR SECURE DATA TRANSMISSION

(75) Inventors: Stephen Savitzky, San Jose, CA (US); Sergey Chemishkian, Cupertino, CA (US); Bradley Rhodes, Alameda, CA (US)

(73) Assignee: Ricoh Co., Ltd., Tokyo (JP)

( * ) Notice: Subject to any disclaimer, the term of this patent is extended or adjusted under 35 U.S.C. 154(b) by 185 days.

(21) Appl. No.: 12/414,448

(22) Filed: Mar. 30, 2009

(65) Prior Publication Data
US 2010/0250995 A1    Sep. 30, 2010

(51) Int. Cl.
*H03C 3/00* (2006.01)
(52) U.S. Cl. .......... 332/117; 455/23; 455/24; 455/41.1; 455/41.2; 455/42; 455/289; 455/318; 455/334; 455/223; 307/104; 343/850
(58) Field of Classification Search .................. 332/117; 455/23, 24, 41.1, 41.2, 42, 289, 318, 334; 455/223; 340/870.18; 307/104; 343/850
See application file for complete search history.

(56) References Cited

U.S. PATENT DOCUMENTS 7,711,322 B2 * 5/2010 Rhodes et al. .................. 455/40
7,841,528 B2 * 11/2010 Savry et al. .................... 235/439

OTHER PUBLICATIONS

Wikipedia, "Delay line oscillator", printed from Internet on Jun. 27, 2011, 1 page, http://en.wikipedia.org/wiki/Delay_line_oscillator, modified on Mar. 29, 2011.

* cited by examiner

*Primary Examiner* — Arnold Kinkead
(74) *Attorney, Agent, or Firm* — Blakely, Sokoloff, Taylor & Zafman LLP (57) ABSTRACT

A split delay-line oscillator for secure data transmission is disclosed. In one embodiment, an apparatus for a split delay-line oscillator for secure data transmission includes a first modulator/demodulator block in a first device, the first modulator/demodulator block operable to insert a first variable delay to modulate a frequency of a shared carrier signal passing through the first modulator/demodulator block, and a second modulator/demodulator block in a second device, the second modulator/demodulator block operable to insert a second variable delay to modulate the frequency of the shared carrier signal passing through the second modulator/demodulator block, wherein the first and second devices create a shared secret by contributing data on the frequency-modulated shared carrier signal.

20 Claims, 5 Drawing Sheets

SPLIT DELAY-LINE OSCILLATOR FOR SECURE DATA TRANSMISSION

FIELD OF THE INVENTION

The present invention relates to data transmission, and more particularly, the present invention relates to a split delay-line oscillator for secure data transmission.

BACKGROUND

Secure communications between devices has always been a high priority in communication protocols. One present solution to implement secure communications is a Diffie-Hellman key exchange. Other security protocols also exist for key exchange, but Diffie-Hellman is one of the most well-known. The Diffie-Hellman key exchanges allows two communications devices to share a secret, such as a session key, that is used to establish a secure communications channel.

However, a problem with the Diffie-Hellman key exchange is the insecurity related to initially establishing and sharing the key between the two devices. A "man in the middle" can eavesdrop in this communication and compromise the secure communications channel. This is also called a "man in the middle" attack. Such attacks are a significant problem for wireless communications, such as Wi-Fi, because the access point is always in the middle.

A recent technological innovation in wireless communication is the tap transfer process. Tap transfer refers to the process of initiating a data transfer from one device to another by tapping them together to induce inductive coupling between the devices. Tap transfer presents a unique opportunity to securely establish a shared secret. First, to perform tap transfer, the two communications devices must be proximally located and, as such, become difficult to eavesdrop on. Second, tap transfer provides enough time (when up in very high radio frequencies) to transmit a couple of hundred bits worth of a secret.

SUMMARY OF THE INVENTION

According to one embodiment, an apparatus includes a first modulator/demodulator block in a first device, the first modulator/demodulator block operable to insert a first variable delay to modulate the frequency of a shared carrier signal passing through the first modulator/demodulator block. The first modulator/demodulator block forms part of a split delay-line oscillator that further includes a second modulator/demodulator block in a second device, with the second modulator/demodulator block operable to insert a second variable delay to modulate the frequency of the shared carrier signal passing through the second modulator/demodulator block. In addition, wherein the first and second devices create a shared secret by contributing data on the frequency-modulated shared carrier signal.

In a further embodiment, a system includes a hybrid circuit at each of a first device and a second device to allow a feedback loop generating a shared carrier signal to be carried over a single bidirectional signal path and a split delay-line oscillator spanning the first device and the second device, the split delay-line oscillator operable to modulate a frequency of the shared carrier signal. The system further operates so that the first device and the second device can create a shared secret based on the data transmitted on the frequency-modulated shared carrier signal.

In another further embodiment, a method includes frequency-modulating a shared carrier signal by a first device, wherein the first device is communicably coupled to a second device to form a split delay-line oscillator to transmit the shared carrier signal and the second device is also frequency modulating the shared carrier signal. The method further includes synchronizing the frequency modulations of the shared carrier signals by the first device with frequency modulations of the shared carrier signal performed by the second device, transmitting random bit streams by the first device on the shared carrier signal, receiving, at the first device, random bit streams on the shared carrier signal from the second device, and establishing a shared secret based on data in the bit streams transmitted on the synchronized, frequency-modulated shared carrier signal.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

A split delay-line oscillator for secure data transmission is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system or network. For example, the invention can operate on a stand alone multifunction printer or a networked printer with functionality varying depending on the configuration. Thus, the present invention is capable of operating with any information system from those with minimal functionality to those providing all the functionality disclosed herein.

Embodiments of the invention provide a split delay-line oscillator for secure data transmission. Specifically, embodiments of the invention separate a delay-line oscillator into two identical modulator/demodulator blocks, and use these blocks to modulate and detect a shared carrier signal with a frequency determined by the total delay in the system. The split delay-line oscillator is used to preserve a shared secret by concealing from a third party which side is contributing data on the shared carrier. The split delay-line oscillator of embodiments of the invention permits a small amount of data to be exchanged securely between two devices located in physical proximity to one another but not in contact, and is specifically designed to prevent man-in-the-middle attacks.

In one embodiment, the split delay-line oscillator may be utilized for a tap transfer application.

Figure 1:
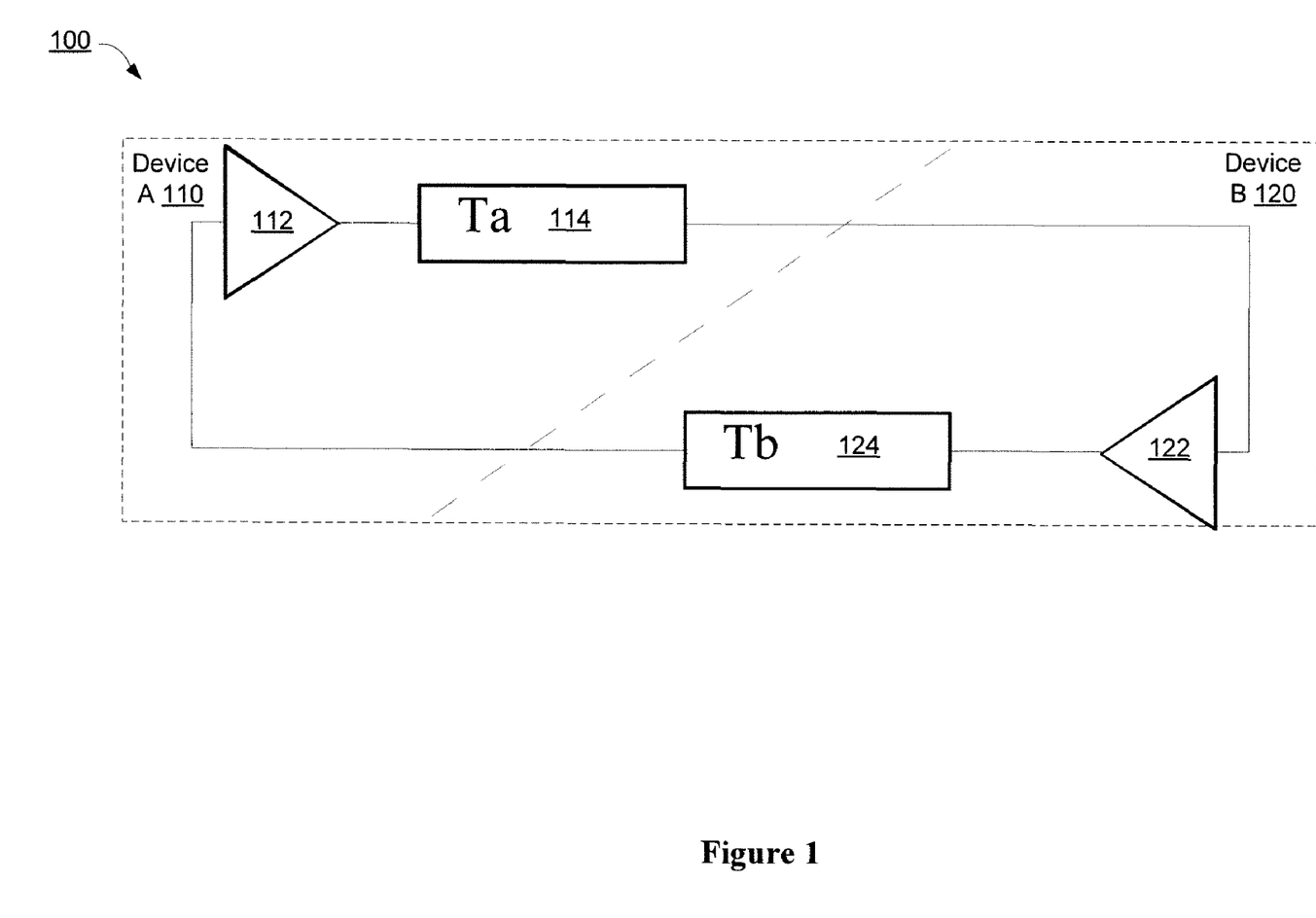
FIG. 1 illustrates one embodiment of a block diagram of a split delay-line oscillator.

FIG. 1 is a block diagram of one embodiment of a split delay-line oscillator 100. Split delay-line oscillator 100 spans two devices: device A 110 and device B 120. In one embodiment, either or both of device A 110 or device B 120 may be a digital signal processor (DSP) or field programmable gate array (FPGA). In some embodiments, device A 110 or device B 120 may be a MFP 500 described with respect to FIG. 5. In other embodiments, device A 110 and device B 120 may be any type of communications device, such as, for example, a cellular telephone. In some embodiments, either or both of the devices 110, 120 may be a mobile device, such as a PDA, a tablet computer, a laptop, and other such devices.

In one embodiment, device A 110 and device B 120 are seeking to communicate with each other in a secure manner. In order to communicate securely, it is necessary for the two devices 110, 120 to establish a shared secret. Embodiments of the split delay-line oscillator 100 provide a mechanism to establish a shared secret in a secure way for future communications between the two devices 110, 120. In another embodiment, the two devices 110, 120 may be connected by a phase-shift oscillator, which may accomplish the same result of the split delay-line oscillator 100.

In one embodiment, the two devices 110, 120 initiate communication to establish their shared secret by the process of tap transfer. Tap transfer refers to the process of initiating a data transfer from one device to another by tapping them together to induce inductive coupling between the devices. In some embodiments, other mechanisms to communicably couple the two devices 110, 120 are envisioned and may also be utilized.

Once the two devices 110, 120 are coupled, the split delay-line oscillator 100 of the two devices 110, 120 is used to establish a shared secret between the two devices 110, 120. The split delay-line oscillator 100 of embodiments of the invention separates a typical delay-line oscillator into two identical modulator/demodulator blocks and uses these blocks to modulate and detect a shared carrier signal with a frequency determined by the total delay in the system. The split delay-line oscillator 100 includes two operational amplifiers 112, 114 and two delay lines 114, 124. Device A 110 includes operational amplifier 112 and delay line 114 (i.e., the first modulator/demodulator block), while device B 120 includes operational amplifier 114 and delay line 124 (i.e., the second modulator/demodulator block).

Embodiments of the invention use the signal-propagation delay between the two devices 110, 120 in a feedback loop, which makes the split delay-line oscillator 100 oscillate at a frequency of 1/T where T, the period of the oscillator, is the total delay around the loop. Specifically, T=Ta+Th+2Tp, where Ta and Th are the delays inside each of the respective devices, and Tp is the propagation delay in one direction between them. Both devices 110, 120 monitor the total period of the system, and modulate Ta and Th respectively.

As each device 110, 120 knows its own contribution to the total period, it can deduce the other side's contribution. From outside the system, the only value easily obtainable is the oscillation frequency of the system and hence the total delay T. Another way of looking at embodiments of the invention is that each side 110, 120 of the oscillator 100 is phase-modulating or frequency-modulating a shared carrier signal that is generated by connecting the two devices 110, 120 as a split delay-line oscillator. The frequency of the modulation corresponds to the baud-rate of the signals being exchanged, thus each device 110, 120 is able to compute the other's transmitted signals or bitstream.

In one embodiment, in order to establish their shared secret, the two devices 110, 120 first synchronize their modulations. This means ensuring that all modulation changes made by each device 110, 120 occur at the same time. In one embodiment, zero-crossings may be utilized as the synchronization point for the two devices. Each device 110, 120 then transmits random sequences of bits on the synchronized, frequency-modulated shared carrier signal. Based on each device's knowledge of its own contribution to the period T of the system, each device is able to determine which data the other side is contributing.

In one embodiment, each device 110, 120 ignores any cycles where the devices send the same bit simultaneously. The remaining bits may then be used as a shared secret in some other protocol, such as interlock with forced latency. One skilled in the art will appreciate that other methods for establishing a shared secret for the transmitted bits may also be utilized. This shared secret may then be used to establish a secure communications channel between the two devices, such as for encrypting a Wi-Fi channel that the two devices communicate over. The shared secret may be used immediately, or stored and used at a later time. Establishment of a secure communications channel with a shared secret is well known in the art and outside of the scope of embodiments of the invention.

One important aspect to embodiments of the invention is that an eavesdropper will not have access to the communication medium between the two devices 110, 120 in a way that allows him or her to separate the input and output signals of any one device. This can be enforced by requiring the separation between the devices to be small enough so that a third party cannot eavesdrop on the communication medium, as well as the communications area between the devices to be under direct physical observation by a user. Such requirements should be easy when the devices have just been tapped together. In addition, the amount of added delay on each side should vary randomly for each bit, over a fairly wide range and with fine granularity. This prevents an eavesdropper from using small differences in the amount of delay each side is introducing to detect which side the delay is coming from.

Embodiments of the invention also envision that the modulation in delay is small compared to the total loop delay, and for the frequency of the modulation (corresponding to the baud-rate of the signals being exchanged) also to be small compared to the system's frequency of oscillation. Also note that compensatory delay may be inserted on each side to stabilize the total loop delay. In addition, if the propagation delay across the gap between the two devices is too short, extra delay may also be provided within each device.

Figure 2:
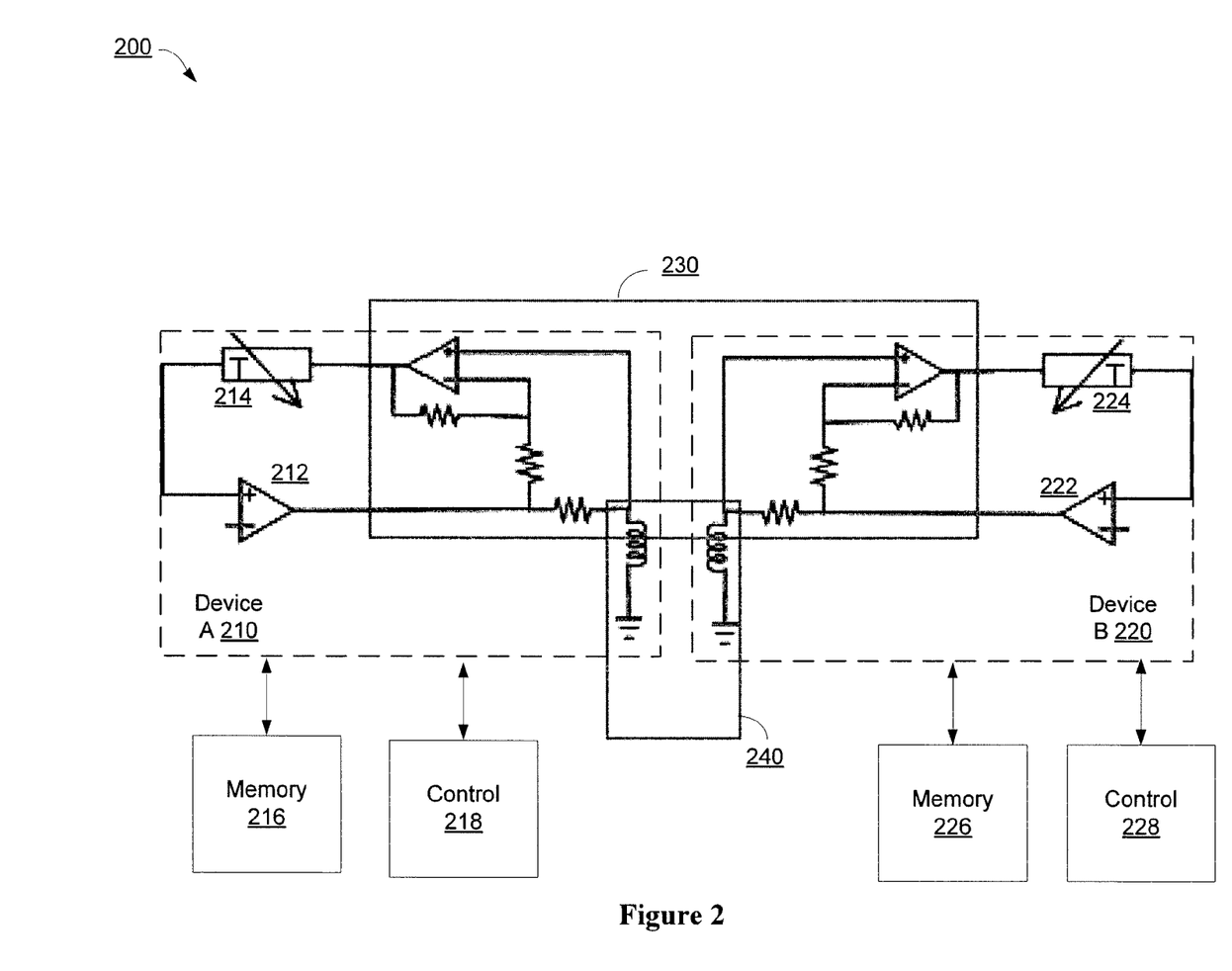
FIG. 2 illustrates one embodiment of a block diagram of a communications system including a hybrid circuit and split delay-line oscillator for use with a bidirectional communication medium.

FIG. 2 is a block diagram of one embodiment of a communications system 200 with a hybrid circuit and split delay-line oscillator for use with a bidirectional communication medium. In one embodiment, the split delay line oscillator of FIG. 2 (represented by components 212, 214, 222, and 224) is the same as the split delay-line oscillator 100 described with respect to FIG. 1.

In system 200, device A 210 and device B 220 are connected via a communication medium 240, such as a capacitive or inductive coupling between the devices 210, 220, for bidirectional communication. In this situation, hybrid circuitry 230, illustrated as operational amplifier-based telephone hybrid circuitry, may be used to allow a shared signal path for bidirectional communication. In another embodiment, hybrid coil circuitry may be provided as the hybrid circuitry 230. In yet another embodiment, a balanced mixer or a phase-locked loop may also be used as the hybrid circuitry 230.

It is well known that hybrid coils or the equivalent active circuitry, such as a pair of ordinary telephony modems, may be used to directly send signals across a bidirectional medium. However, this type of circuitry is prone to eavesdropping by a man-in-the-middle attack. Embodiments of the invention address this eavesdropping vulnerability by utilizing a split delay-line oscillator 212, 214, 222, 224 on both sides of the communication medium to simultaneously modulate what amounts to the same carrier signal.

As described with respect to FIG. 1, the split delay-line oscillator 212, 214, 222, 224 operates in such a way as to make the modulation inserted from each device 210, 220 undetectable by an eavesdropper. Devices A and B 210, 220 also are shown to include a memory 216, 226 and control logic 218, 228. In one embodiment memory 216, 226 may be used to store the results of data passing between the devices 210, 220 as well as any shared secrets determined from that data. Control logic 218, 228 may be used to determine which data to ignore (i.e., from simultaneous identical data cycles) and also to establish the shared secret.

Figure 3:
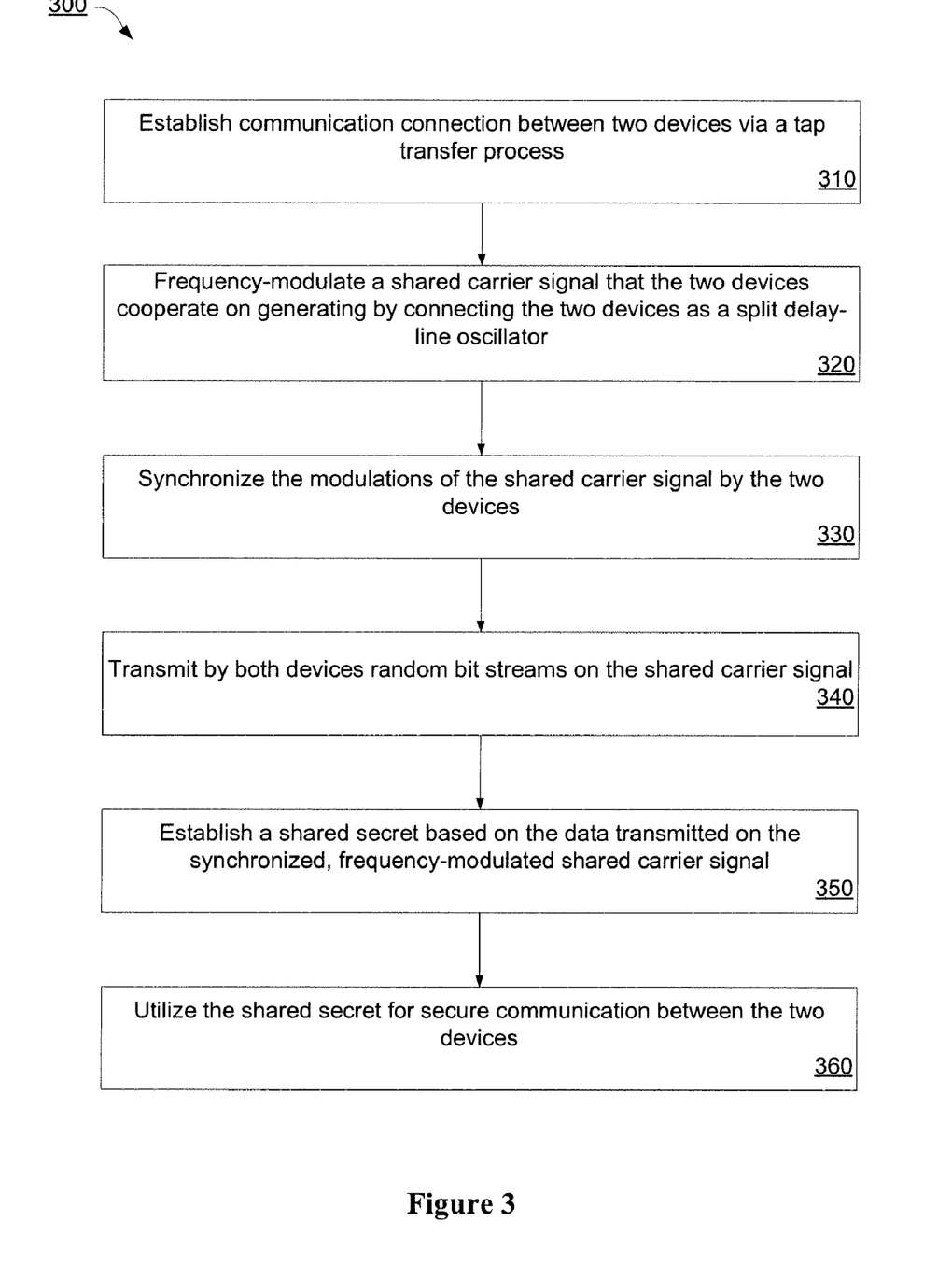
FIG. 3 is a flow chart illustrating one embodiment of a process for establishing a secure communication channel between two devices using tap transfer and a split delay-line oscillator.

FIG. 3 is a flow diagram illustrating a process 300 for establishing a secure communication channel between two devices using tap transfer and a split delay-line oscillator according to an embodiment of the invention. Process 300 may be performed by processing logic that may comprise hardware (e.g., circuitry, dedicated logic, programmable logic, microcode, etc.), software (such as instructions run on a processing device), or a combination thereof. In one embodiment, process 300 may be performed by split delay-line oscillator 100 described with respect to FIG. 1.

Process 300 begins at block 310 where a communication connection between two devices is established via a tap transfer process. In one embodiment, the tap transfer process refers to the process of initiating a data transfer from one device to another by tapping them together to induce inductive coupling between the devices. At block 320, a common carrier signal is frequency-modulated by the two devices via a split delay-line oscillator operating on both of the devices. The split delay-line oscillator enables the two devices to cooperate in frequency-modulating the common carrier signal.

Then, at block 330, the modulations of the shared carrier signal by the two devices are synchronized. The two devices then each transmit random bit streams on the shared carrier signal at block 340. Based on the bit streams transmitted on the synchronized, frequency-modulated common carrier signal, the two devices are able to establish a shared secret at block 350. As described above, in one embodiment, each device may ignore any cycles when they send the same bit simultaneously and the remaining bits are used as the shared secret between the two devices. The two devices are the only ones capable of knowing the shared secret because eavesdroppers should not be able to detect which device contributes which data on the frequency-modulated shared carrier signal. The shared secret may then be utilized for secure communications between the two devices at block 360. In one embodiment, this may include encrypting unsecure communication channels, such as a Wi-Fi channel, with the shared secret.

Figure 4:
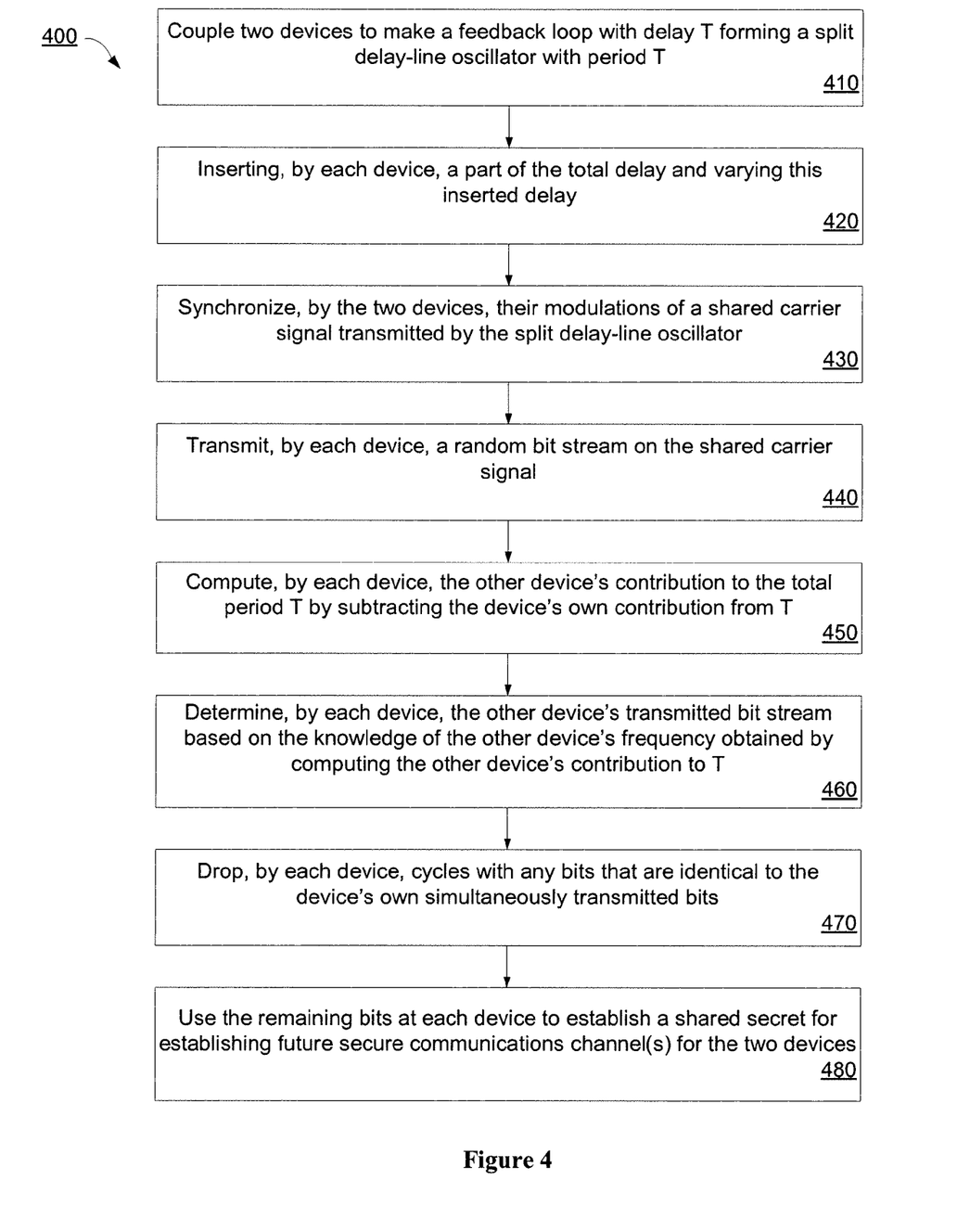
FIG. 4 is a flow chart illustrating an embodiment of process for establishing a shared secret with a split delay-line oscillator.

FIG. 4 is a flow diagram illustrating a more-detailed process 400 for establishing a shared secret with a split delay-line oscillator according to an embodiment of the invention. Process 400 may be performed by processing logic that may comprise hardware (e.g., circuitry, dedicated logic, programmable logic, microcode, etc.), software (such as instructions run on a processing device), or a combination thereof. In one embodiment, process 400 may be performed by split delay-line oscillator 100 described with respect to FIG. 1.

Process 400 begins at block 410 where two devices are coupled to make a feedback loop with delay, T, forming a split delay-line oscillator with period T. Then, at block 420, each device inserts a part of the total delay and modulates this delay over time. At block 430, the two devices synchronize their modulations of the shared carrier signal transmitted by the split delay-line oscillator. Then, each device transmits a random bit stream on the synchronized, frequency-modulated shared carrier signal at block 440.

Subsequently, at block 450, each device computes the other device's contribution to the total period, T, by subtracting the device's own contribution from the total period T. In addition, any propagation delay between the two devices is accounted for when determining the other device's contribution. Then, at block 460, each device determines the other device's transmitted bit stream based on the knowledge of the other device's frequency, which was obtained by computing the other device's contribution to the total period T in block 450.

At block 470, each device may then drop any cycles with bits that are identical to the device's own simultaneously transmitted bits. Lastly, at block 480, the devices use the remaining bits to create a shared secret for establishing future secure communications channel(s) for the two devices.

Figure 5:
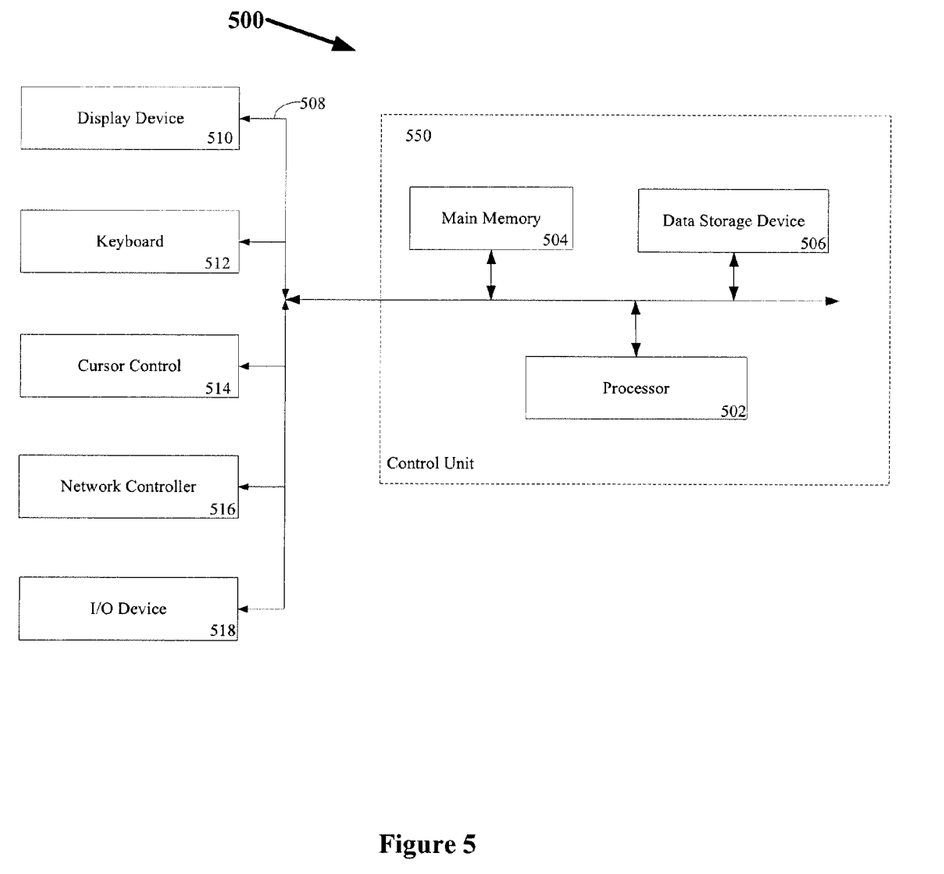
FIG. 5 illustrates one embodiment of a block diagram of a multi-function printer (MFP).

FIG. 5 is a block diagram of one embodiment of a multi-function printer (MFP) 500. The multi-function printer 500 includes a control unit 550, a display device 510, a keyboard 512, a cursor control device 514, a network controller 516 and one or more input/output (I/O) device(s) 518.

Control unit 550 may include an arithmetic logic unit, a microprocessor, a general purpose computer, a personal digital assistant or some other information appliance equipped to provide electronic display signals to display device 510. In one embodiment, control unit 550 includes a general purpose computer having a graphical user interface, which may be generated by, for example, a program written in JAVA running on top of an operating system, such as WINDOWS or UNIX-based operating systems. In a further embodiment, one or more application programs are executed by control unit 550 including, without limitation, word processing applications, electronic mail applications, financial applications, and web browser applications.

Still referring to FIG. 5, control unit 550 is shown including processor 502, main memory 504, and data storage device 506, all of which are communicatively coupled to system bus 508. Processor 502 processes data signals and may comprise various computing architectures including a complex instruction set computer (CISC) architecture, a reduced instruction set computer (RISC) architecture, or an architecture implementing a combination of instruction sets. Although only a single processor is shown in FIG. 5, multiple processors may be included.

Main memory 504 stores instructions and/or data that may be executed by processor 502. The instructions and/or data may comprise code for performing any and/or all of the techniques described herein. Main memory 504 may be a dynamic random access memory (DRAM) device, a static random access memory (SRAM) device, or some other memory device known in the art.

Data storage device 506 stores data and instructions for processor 502 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 508 represents a shared bus for communicating information and data throughout control unit 550. System bus 508 may represent one or more buses including an industry standard architecture (ISA) bus, a peripheral component interconnect (PCI) bus, a universal serial bus (USB), or some other bus known in the art to provide similar functionality. Additional components coupled to control unit 550 through system bus 508 include the display device 510, the keyboard 512, the cursor control device 514, the network controller 516 and the I/O device(s) 518.

Display device 510 represents any device equipped to display electronic images and data as described herein. Display device 510 may be, for example, a cathode ray tube (CRT), liquid crystal display (LCD), or any other similarly equipped display device, screen, or monitor. In one embodiment, display device 510 is equipped with a touch screen in which a touch-sensitive, transparent panel covers the screen of display device 510.

Keyboard 512 represents an alphanumeric input device coupled to control unit 550 to communicate information and command selections to processor 502. Keyboard 512 can be a QWERTY keyboard, a key pad, or representations of such created on a touch screen.

Cursor control 514 represents a user input device equipped to communicate positional data as well as command selections to processor 502. Cursor control 514 may include a mouse, a trackball, a stylus, a pen, a touch screen, cursor direction keys, or other mechanisms to cause movement of a cursor.

Network controller 516 links control unit 550 to a network that may include multiple processing systems. The network of processing systems may comprise a local area network (LAN), a wide area network (WAN) (e.g., the Internet), and/or any other interconnected data path across which multiple devices may communicate. The control unit 550 also has other conventional connections to other systems such as a network for distribution of files (media objects) using standard network protocols such as TCP/IP, http, https, and SMTP as will be understood to those skilled in the art.

One or more I/O devices 518 are coupled to the system bus 508. For example, the I/O device 518 includes an image scanner and document feeder for capturing an image of a document. The I/O device 518 also includes a printer for generating documents. The I/O device 518 may also include audio input/output device equipped to receive audio input via a microphone and transmit audio output via speakers.

In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing.

It should be apparent to one skilled in the art that MFP 500 may include more or less components than those shown in FIG. 5 without departing from the spirit and scope of the present invention. For example, MFP 500 may include additional memory, such as, for example, a first or second level cache, or one or more application specific integrated circuits (ASICs). Similarly, additional components input/output devices 518 may be coupled to control unit 550 including, for example, an RFID tag reader, digital still or video cameras, or other devices that may or may not be equipped to capture and/or download electronic data to control unit 550. One or more components could also be eliminated such as cursor control 514.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An apparatus, comprising:
a first modulator/demodulator block in a first device, the first modulator/demodulator block operable to insert a first variable delay to modulate a frequency of a shared carrier signal passing through the first modulator/demodulator block;
wherein the first modulator/demodulator block forms part of a split delay-line oscillator that further includes a second modulator/demodulator block in a second device, the second modulator/demodulator block operable to insert a second variable delay to modulate the frequency of the shared carrier signal passing through the second modulator/demodulator block; and
wherein the first and second devices create a shared secret by contributing data on the frequency-modulated shared carrier signal.

2. The apparatus of claim 1, wherein a total delay of the frequency-modulated shared carrier signal is determined by adding the first variable delay, the second variable delay, and twice an amount of a propagation delay between the first device and the second device.

3. The apparatus of claim 1, wherein the first and second modulator/demodulator blocks each include an operational amplifier and a delay line.

4. The apparatus of claim 1, wherein the first and second modulator/demodulator blocks synchronize each of their respective modulations of the frequency of the shared carrier signal prior to contributing data on the shared carrier signal.

5. The apparatus of claim 1, wherein the first device and the second device ignore the data from any cycles where each of the first device and the second device simultaneously transmit identical data.

6. The apparatus of claim 5, wherein any remaining data from cycles that are not ignored is used to create the shared secret.

7. The apparatus of claim 1, wherein the first device and the second device perform a tap transfer process to inductively couple the first and the second modulator/demodulator blocks to form the split delay-line oscillator.

8. A system, comprising:
a hybrid circuit at each of a first device and a second device to allow a feedback loop generating a shared carrier signal to be carried over a single bidirectional signal path; and
a split delay-line oscillator spanning the first device and the second device, the split delay-line oscillator operable to modulate a frequency of the shared carrier signal;
wherein the first device and the second device to create a shared secret based on the data transmitted on the frequency-modulated shared carrier signal.

9. The system of claim 8, wherein the split delay-line oscillator includes a first modulator/demodulator block on the first device and a second modulator/demodulator block on the second device, wherein each of the first and second modulator/demodulator blocks operable to insert variable delay on the shared carrier signal.

10. The system of claim 9, wherein a total delay of the shared carrier signal is determined by adding the variable delay provided by each of the first and second modulator/demodulator blocks and twice an amount of a propagation delay between the first device and the second device.

11. The system of claim 9, wherein the first and second modulator/demodulator blocks synchronize each of their respective modulations of the frequency of the shared carrier signal prior to contributing data on the shared carrier signal.

12. The system of claim 9, wherein the first and second modulator/demodulator blocks each include an operational amplifier and a delay line.

13. The system of claim 8, wherein the first device and the second device perform a tap transfer process to inductively couple the first and the second modulator/demodulator blocks.

14. The system of claim 8, wherein the first device and the second device are at least one of a digital signal processor (DSP) or a field programmable gate array (FPGA).

15. A method, comprising:
frequency-modulating a shared carrier signal by a first device, wherein the first device is communicably coupled to a second device to form a split delay-line oscillator to transmit the shared carrier signal and the second device is also frequency modulating the shared carrier signal;
synchronizing the frequency modulations of the shared carrier signals by the first device with frequency modulations of the shared carrier signal performed by the second device;
transmitting random bit streams by the first device on the shared carrier signal;
receiving, at the first device, random bit streams on the shared carrier signal from the second device; and
establishing a shared secret based on data in the bit streams transmitted on the synchronized, frequency-modulated shared carrier signal.

16. The method of claim 15, further comprising establishing a communication connection between the first and the second devices via a tap transfer process.

17. The method of claim 15, further comprising utilizing the shared secret for future secure communications between the first and the second devices.

18. The method of claim 15, wherein the first device and the second device ignore the data from any cycles where each of the first device and the second device simultaneously transmit identical data and any remaining data from cycles that are not ignored is used to create the shared secret.

19. The method of claim 15, wherein the split delay-line oscillator includes a first modulator/demodulator block on the first device and a second modulator/demodulator block on the second device, wherein each of the first and second modulator/demodulator blocks operable to insert variable delay on the shared carrier signal.

20. The method of claim 19, wherein frequency-modulating the shared carrier signal by the first device further includes inserting the variable delay to a feedback loop of the split delay-line oscillator.

* * * * *